United States Patent
Hebbecker et al.

(10) Patent No.: US 11,525,495 B2
(45) Date of Patent: Dec. 13, 2022

(54) LINK CHAIN

(71) Applicant: Ketten-Wulf Betriebs-GmbH, Eslohe-Kuckelheim (DE)

(72) Inventors: Thomas Hebbecker, Kirchhundem (DE); Tobias Wulf, Eslohe (DE)

(73) Assignee: KETTENWULF BETRIEBS GMBH, Eslohe-Kückelheim (DE)

( * ) Notice: Subject to any disclaimer, the term of this patent is extended or adjusted under 35 U.S.C. 154(b) by 305 days.

(21) Appl. No.: 16/577,866

(22) Filed: Sep. 20, 2019

(65) Prior Publication Data
US 2020/0018378 A1    Jan. 16, 2020

Related U.S. Application Data

(63) Continuation of application No. PCT/EP2018/059046, filed on Apr. 9, 2018.

(30) Foreign Application Priority Data

Apr. 11, 2017   (DE) .......................... 102017107870.3

(51) Int. Cl.
F16G 13/06    (2006.01)
F16G 13/02    (2006.01)

(52) U.S. Cl.
CPC ............. *F16G 13/06* (2013.01); *F16G 13/02* (2013.01)

(58) Field of Classification Search
CPC ................................ F16G 13/06; F16G 13/02
USPC ................... 474/226, 228, 206, 91
See application file for complete search history.

(56) References Cited

U.S. PATENT DOCUMENTS

| 4,102,216 A |   | 7/1978 | Nagano |
|---|---|---|---|
| 4,265,134 A | * | 5/1981 | Dupoyet ................. F16G 13/06 59/8 |
| 5,222,920 A | * | 6/1993 | Cheesman .............. F16G 13/06 474/213 |
| 5,322,483 A |   | 6/1994 | Wang |
| 7,325,391 B1 |   | 2/2008 | Oishi et al. |

(Continued)

FOREIGN PATENT DOCUMENTS

| CH | 681909 A5 | 6/1993 |
|---|---|---|
| CN | 2146605 Y | 11/1993 |

(Continued)

OTHER PUBLICATIONS

Office Action in corresponding Saudi Arabai Patent Application No. 519410280, dated Feb. 10, 2021, with English translation.

(Continued)

*Primary Examiner* — Gene O Crawford
*Assistant Examiner* — Emily R Kincaid
(74) *Attorney, Agent, or Firm* — Edell, Shapiro & Finnan, LLC

(57) ABSTRACT

A link chain comprises an inner link plate, an outer link plate, a bushing and a pin that form a chain link, and a labyrinth seal between the outer link plate and the inner link plate. The labyrinth seal comprises at least one lug having lug length and at least one groove having a groove depth, the lug length and groove depth being between 10% to 50% of an average respective link plate thickness, wherein in response to an overload of the link chain, the flow of force within the link chain is partially diverted across surfaces of the labyrinth seal formed by the at least one lug and the at least one groove.

16 Claims, 13 Drawing Sheets

(56) References Cited

U.S. PATENT DOCUMENTS

| | | | |
|---|---|---|---|
| 9,255,624 B2* | 2/2016 | Fukumori | F16G 13/06 |
| 2005/0164816 A1* | 7/2005 | Wang | F16G 13/06 |
| | | | 474/228 |
| 2006/0014600 A1 | 1/2006 | Wu | |
| 2008/0182691 A1* | 7/2008 | Wu | F16G 13/06 |
| | | | 474/223 |
| 2014/0028019 A1 | 1/2014 | Magno | |
| 2016/0075391 A1 | 3/2016 | Pedani et al. | |
| 2018/0187749 A1* | 7/2018 | Fukumori | F16G 13/06 |

FOREIGN PATENT DOCUMENTS

| | | | | |
|---|---|---|---|---|
| CN | 2546688 | Y | | 4/2003 |
| CN | 205101466 | U | | 3/2016 |
| DE | 187885 | | | 6/1906 |
| DE | 506899 | | | 11/1926 |
| DE | 1111467 | B | | 7/1961 |
| DE | 2658651 | A1 | | 7/1977 |
| DE | 3308681 | A1 | | 9/1984 |
| DE | 3407169 | A1 | | 9/1985 |
| DE | 4241758 | A1 | | 6/1994 |
| DE | 19918703 | A1 | | 11/2000 |
| DE | 102007009821 | A1 | | 10/2007 |
| DE | 202008004245 | U1 | | 6/2008 |
| DE | 202014105286 | U1 | | 2/2016 |
| DE | 102016009814 | A1 | | 3/2017 |
| EP | 0886082 | A | | 12/1998 |
| EP | 0886082 | A1 | | 12/1998 |
| EP | 2538032 | A1 | | 12/2012 |
| GB | 280897 | A | * 6/1928 | F16J 15/447 |
| JP | 52168148 | U | | 12/1977 |
| JP | 568597 | U | | 1/1981 |
| JP | 0241991 | A | | 2/1990 |
| JP | 2006064049 | A | * 3/2006 | |
| JP | 2006064049 | A | | 3/2006 |
| JP | 2008164043 | A | | 7/2007 |
| JP | 2008164043 | A | * 7/2008 | |
| JP | 2008164043 | A | | 7/2008 |
| JP | 2008208887 | A | * 9/2008 | |
| JP | 4257793 | B2 | | 4/2009 |
| JP | 2014190441 | A | | 10/2014 |
| JP | 2016075391 | A | | 5/2016 |
| JP | 6035661 | B2 | | 11/2016 |
| JP | 2016217509 | A | | 12/2016 |
| RU | 2472049 | C2 | | 1/2013 |
| SU | 66741 | A1 | | 11/1945 |
| WO | 2005043005 | A1 | | 5/2005 |
| WO | WO-2014086337 | A2 | * 6/2014 | B65G 17/126 |

OTHER PUBLICATIONS

Search Report in corresponding Russian Patent Application No. 2019135653, dated Feb. 10, 2021, with English translation.
Office action in corresponding German Patent Application No. 102017107870.3, dated May 28, 2020, with English translation.
International Search Report in corresponding International Application No. PCT/EP2018/059046, dated Aug. 1, 2018, with English Translation.
Office Action in corresponding Japanese Patent Application No. 2019-555937, dated Feb. 15, 2022, with English translation.
Office action in corresponding Chinese Patent Application No. 201880024159.3, dated Dec. 14, 2020, with English translation.
Brazilian Office Action with English translation in Brazilian Application No. BR112019020560-8, dated Jul. 4, 2022, 5 pages.

* cited by examiner

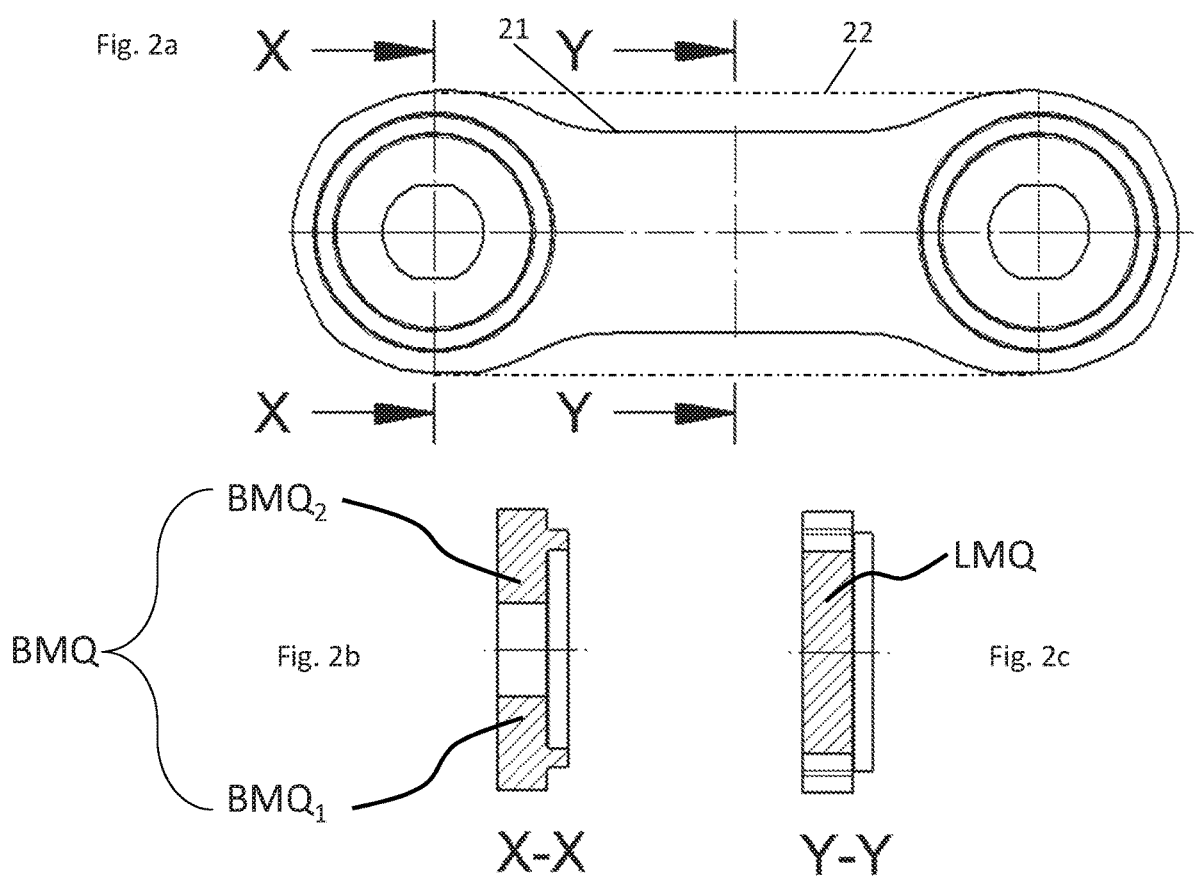

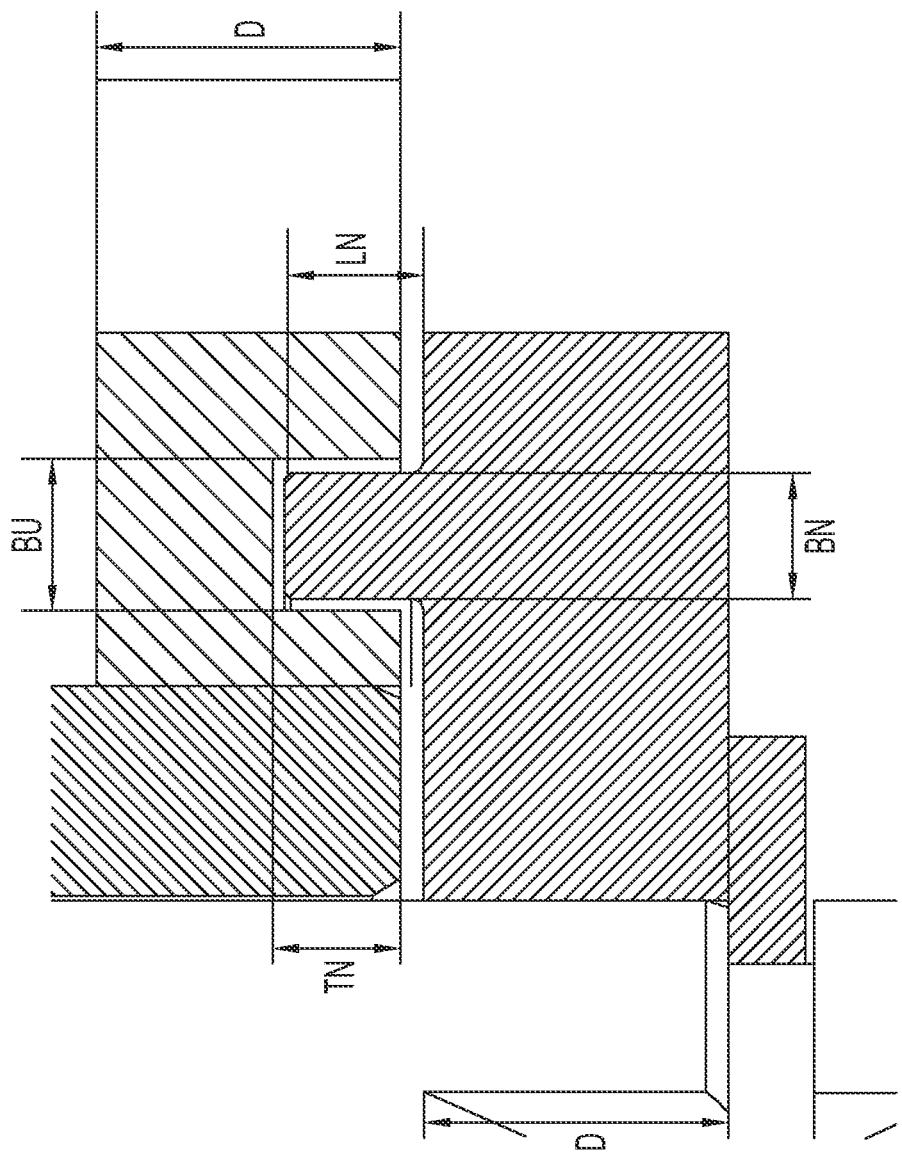

LINK CHAIN

CROSS REFERENCE TO RELATED APPLICATIONS

This application is a continuation of International Application No. PCT/EP2018/059046, filed on Apr. 9, 2018, which claims priority under 35 U.S.C. § 119 to Application No. DE 102017107870.3 filed on Apr. 11, 2017, the entire contents of which are hereby incorporated by reference.

TECHNICAL FIELD

The present disclosure relates to a link chain.

BACKGROUND

A link chain, in particular, a bushing chain, is composed essentially of two elements that are lined up next to one another in an endless manner. These elements are also referred to as an inner member and an outer member. An outer member usually consists of two outer link plates that are securely connected to one another by two pins. An inner member is usually made up of two inner link plates and two bushings, which form one chain link each with the pins of the adjacent outer members. These links allow the link chain, for example, to wrap around the sprockets, located in the drive train.

A key criterion for using a link chain is the tension that it can transmit. In principle, a suitable transmittable tension can be achieved by, for example, the choice of material, the heat treatment and the material thickness of the individual components of the link chain. However, the choice of material and/or the dimensioning is/are constrained, for example, by the available installation space and ultimately also by the justifiable costs for a link chain.

SUMMARY

Disclosed is an improved link chain capable of transmitting a higher tension and/or having an improved dynamic load-carrying capacity at otherwise the same or similar dimensions, in particular, the same weight. More particularly, between an outer link plate and an inner link plate of the link chain, there is provided a labyrinth seal that comprises at least one lug and at least one groove, wherein the at least one lug and the at least one groove are designed with a length or depth between 10% to 50% of the respective average link plate thickness, preferably in a range of 20% to 40% of the respective average link plate thickness, wherein the labyrinth seal is designed such that in the event of an overload of the link chain the flow of force within the link chain is partially diverted across the labyrinth surfaces formed by the at least one lug and the at least one groove. This measure allows the at least one lug and groove of the labyrinth seal on the link plates to be designed such that there is a sufficient, preferably maximum possible, overlapping in the direction of the chain tension, an aspect that in turn can ensure that the labyrinth seal can be configured as such for the transmission of appropriate tension forces.

The ingress of dirt into the link region of a chain can be delayed by labyrinths. These labyrinths may be implemented in the form of additional components, such as, for example, a lamellar sealing ring or specially designed link plates, such as, for example, grooves and lugs in the region of the pitch holes, in combination with protruding bushings. The air gap within these labyrinths should be adjusted, taking into account the link play as well as the normal wear of the chain components.

If now an overload on the chain is generated, during which, as a result, the chain tension is high with respect to the operating force, then the link plates will elongate in the cross-sectional area of the bores. As soon as this elongation exceeds the air gap between the labyrinth surfaces, the flow of force within the chain is partially diverted across the labyrinth surfaces. This leads to a smaller load on the already deformed regions of the components (pin, bushing, head regions of the inner and outer link plates). In this way, the breaking force of a chain can be optimized in total. At the same time, the adjustment of the air gaps within the labyrinths should be adapted, preferably taking into account the ductility of the materials that are used. Owing to the use of high strength and simultaneously ductile materials, such as, for example, 42CrMo4, it is possible to use the labyrinths to maximize the transmission of force.

In one advantageous implementation, the width of the at least one lug and/or groove is designed with a thickness that is in the range of 80% to 120% of the lug length or the groove depth, respectively.

In a further advantageous implementation, the corners and edges of the at least one lug and/or groove are designed in each case with identical radii or chamfers, at a minimum, however, with approximately identical radii or chamfers. As a result, the load-bearing region can be increased in size.

In an additional advantageous implementation, the radial clearance between the at least one groove and lug in the labyrinth is between 0.6 and 2.25 mm. Based on a typical play in a chain link between 0.4 and 1.5 mm, the clearance between groove and lug in the labyrinth should be designed approximately 50% larger, depending on the ambient conditions. In this way, it is ensured that there is no contact with the labyrinths under normal operating force. The axial clearance can be adjusted in the same way.

In one advantageous implementation, the labyrinth seal is designed so as to be undercut, in particular, that the at least one groove and lug are designed so as to be dovetailed. The chain tension and the inevitable bending of the pins give rise to a force component that exerts a load on the outer link plate axially on the pin. This situation may result in the outer link plate being pulled by the pin. Due to the aforementioned measure, the labyrinths can optimize the axial securing of the pins in a suitable design.

The outer link plate may have a section that is offset from the center of the chain, wherein the offset section is arranged between the chain links in a central region of the outer link plate.

Due to the chain tension, those components of the link chain that are involved in the flow of force are deformed purely elastically up to a certain force. This deformation has an impact on the contact between the link bushing and the chain pin. Due to the deflection of the pin, the contact shifts into the outer region of the bushing bore. This effect is intensified as the tension of the chain increases. In mathematical terms, it can be assumed roughly that there is a point-shaped contact between the bushing and the pin.

The press fit between the pins and the outer link plates also allows the outer link plate to be deformed by the bending of the pin. The result is a deflection of the outer link plate towards the chain center. This results in tensile stresses on the side, facing the center of the chain, and in compressive stresses on the side, facing outwards, in the outer link plate. These stresses are superimposed with those tensile stresses within the link plate that result from the chain tension forces.

As already stated, it can be provided that the bending stresses in the outer link plates can be reduced due the fact that the outer link plate has a section that is offset from the center of the chain. This measure allows the center axis of the section to pass through that point of the transmission of force, which is to be expected under tensile load of the link chain, between bushing and pin. As a result, the superimposed bending stresses in the described section do not even occur or alternatively are reduced to a minimum.

It can be provided that the outer link plate and/or the inner link plate is/are designed so as to be waisted (i.e., to have a narrower width in a center portion than on end portions).

Usually the link plates have different cross sections perpendicular to the direction of the chain tension. As a result, there are significantly reduced cross-sectional areas in the region of the bores. In contrast, the central region of the link plate has a much larger cross-sectional area. The goal is to adapt the cross-sectional areas such that the results are roughly the same stress distributions.

For this purpose it is proposed to waist the link plate accordingly, so that the cross-sectional areas perpendicular to the direction of the chain converge in large regions of the link plate. In this way, the stresses in the central region of the link plate are distributed more uniformly over the entire cross section.

It is provided that the inner link plate and/or the outer link plate is/are provided with at least one reinforcement, wherein two reinforcements, which are spaced apart from one another and from the longitudinal axis of the inner link plate and/or of the outer link plate, are arranged on each of the link plate heads of the inner link plate and/or the outer link plate. In this case, the reinforcement may be designed as a thickening of the link plate wall on that side of the bore that faces away from the center of the link plate.

The reinforcement is arranged in or alternatively on the link plate head segment, preferably in the range of an angle of 20° to 50°, more preferably in the range between 25° and 40°, relative to the longitudinal axis of the link plate and the center of the bore. The reinforcement can be designed as a simple thickening or, more specifically, as a material reinforcement. In other words, the link plate head is designed in the range 20° to 50°, more preferably in the range between 25° and 40°, thicker than in the other ranges of 0° to 20° or 50° to 90°, respectively. In this context the longitudinal axis of the link plate should be assumed to be at an angle of 0°.

With respect to the extent of the reinforcement, the cross section of the link plate in the transition from the link plate head segment to the inner link plate can be used such that the cross section of the thickening, measured at the cross-sectional area with the largest radius through the reinforced region, should be 5% to 25%, preferably 10% to 18%, larger than the bore wall cross section of the respective link plate head segment. In other words, the section, resulting from a cut through the reinforcement, at the location of the largest radius from the center of the bore up to the outer edge of the link plate, in particular, of the reinforced link plate head segment, should be 5% to 25%, preferably 10% to 18% larger than the bore wall cross section of the reinforced link plate head segment.

Of course, these explanations can also be applied to the reinforcement of the other link plate head segments.

The cross-sectional areas of the link plates are automatically weakened by the necessary bores for inserting the bushings and pins in the region of the link plate heads. The transmission of the chain tension forces gives rise to elevated concentrations of stress in this critical cross section as well as in the head region of the link plates.

The local reinforcement of this region of the link plates can be used to increase the breaking force when the chain dimensions (bushing diameter, pin diameter, link plate height, link plate thickness, link plate length, pitch, etc.) are fixed.

It can be provided that the cross section perpendicular to the longitudinal axis of the at least one inner link plate and/or the at least one outer link plate along the longitudinal axis of the link plate deviates less than 20%, preferably less than 10% from one another, more preferably is identical.

In operation, lengthening of the chain may become necessary due to the occurring malfunctions, overload situations or other influences. These changes in length are distributed within the chain to those regions that exhibit the least stiffness. Should this load occur repeatedly, then there is a risk of material fatigue at these positions.

On account of the large bores in the head region of the link plates (for receiving the bushings and pins) the smallest cross sections and, thus, the least stiffnesses of the link plates may be found in this region.

A material fatigue can be counteracted by the aforementioned measure. For the rest of the link plates those link plate cross sections that correspond to the cross sections in the critical region, i.e., the region in the center of the link plate bore, should be selected. Desirable deviations between the individual cross-sectional areas are about 20%. Preferably deviations of less than 10% should be adhered to; even more preferably, the individual cross-sectional areas should be identical. The sections with identical or rather approximately identical cross sections should be punched as continuously as possible in the longitudinal direction of the link plate.

The chain components, in particular, the inner link plates and/or the outer link plates, can be formed as homogeneously as possible with respect to their stiffness. This distributes the necessary changes in length during operation to larger regions of the chain and, in so doing, reduces the risk of material fatigue.

Due to the structural and geometric conditions of a chain, the chain link plates should be considered, in particular. As a result of the waisting (i.e., central portion narrowing), which has already been discussed above, the cross section of the link plate in the central region can be significantly reduced and can approximate the cross section in the region of the bores, in particular, can even drop below it.

In addition, the stiffnesses can be adjusted by bores in the central regions of the link plates. This design should be used, especially if the outer contour of the link plates is fixed due to certain conditions. This may result, for example, from a sliding removal of forces across the link plates.

All of the measures proposed above may be carried out individually or in any combination at a link chain. Furthermore, they are suitable for the inner link plate and/or the outer link plate of a link chain.

BRIEF DESCRIPTION OF THE DRAWINGS

Other features and advantages of the described link chain will become apparent from the following description of example implementations with reference to the accompanying drawings, which show in:

FIG. 2a is a waisted outer link plate of a link chain in accordance with the disclosed link chain;

FIG. 2b is a cross section BMQ according to section X-X;

FIG. 2c is a cross section LMQ according to section Y-Y;

FIG. 4a is an enlarged view according to FIG. 4;

DETAILED DESCRIPTION

Figure 1:
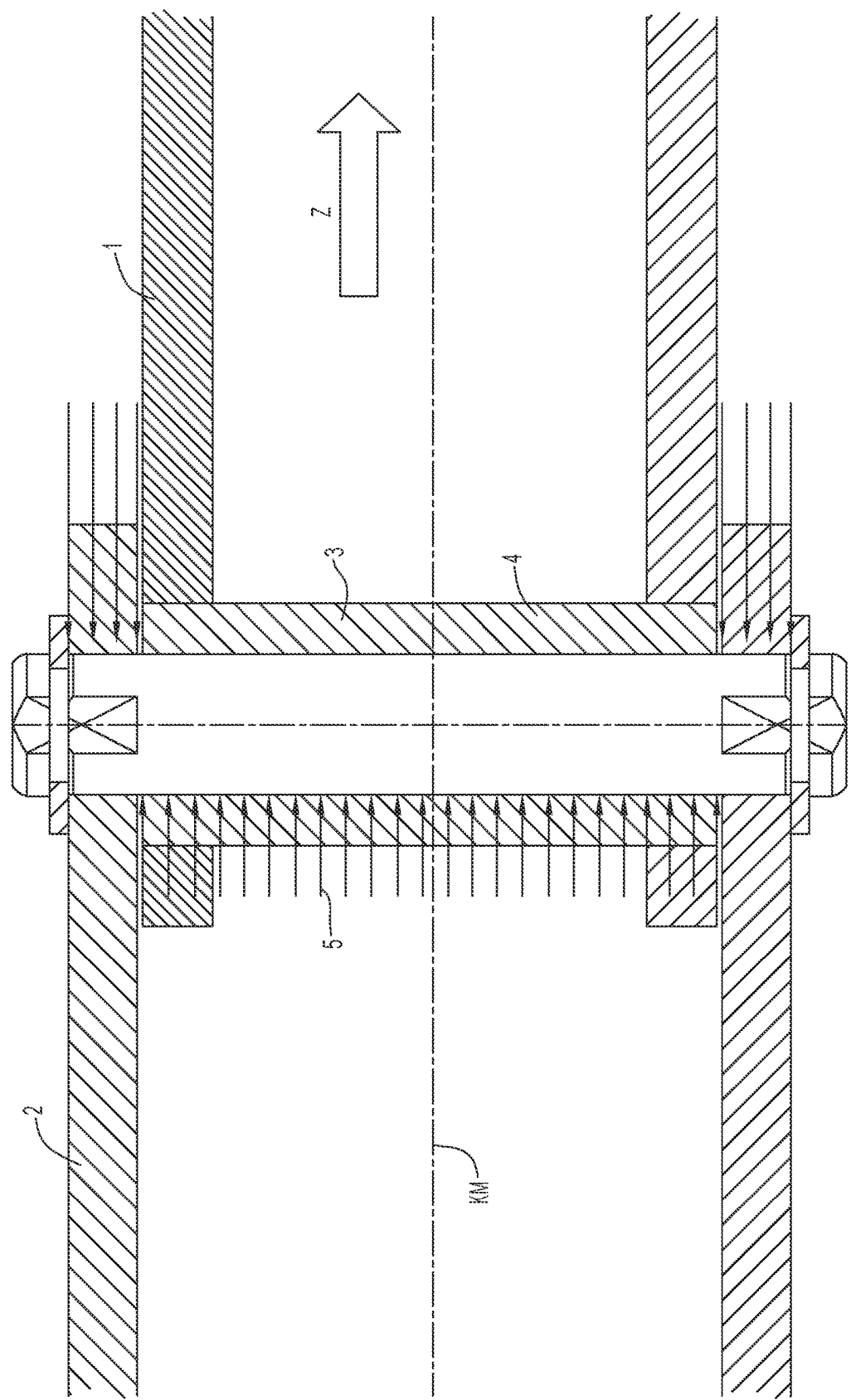
FIG. 1 is a conventional link chain with an indication of the line load between pin and bushing.

The construction of a link chain is sufficiently well-known to the person skilled in the art. A link chain, in particular, a bushing link, is composed essentially of two elements that are lined up next to one another. These elements are also referred to as an inner member and an outer member. An outer member usually consists of two outer link plates 2 that are connected to one another by two pins 4. An inner member is usually made up of two inner link plates 1, which are connected to one another by two bushings 3.

In each case a bushing 3 and a pin 4, which is inserted into the bushing 3 and is part of the adjacent chain links, form a chain link. These links allow the link chain, for example, to wrap around the sprockets, located in the drive train. The aforementioned implementation forms a simple link chain. Of course, more link plates per inner member or outer member, respectively, are also conceivable. Conceivable are also fewer link plates per chain link, such as in the case of a block link plate or, more specifically, a block link plate chain.

For orientation, some regions of the link plates or rather the link chain shall be defined in more detail. The following axes define geometric relationships.

The link chain has a chain center KM, which extends in the longitudinal direction of the link chain and which can be referred to as the center axis of the chain.

The inner link plate 1 and/or the outer link plate 2 has/have in each case at least two bores 5, 5a for receiving the bushings 3 and the pins 4, respectively.

The inner link plate 1 and/or the outer link plate 2 has/have in each case a link plate longitudinal axis L, which extends centrally in the longitudinal direction of the link plate.

The inner link plate 1 and/or the outer link plate 2 has/have in each case a link plate center axis LM, which is arranged, preferably centrally, between the bores 5 and 5a respectively, and is aligned perpendicular to the longitudinal axis L of the link plate.

The inner link plate 1 and/or the outer link plate 2 or, more specifically, their bores 5 and 5a, respectively, have in each case bore center axes $BM_1$ and $BMQ_2$, respectively, which pass through the center of the bores and are aligned perpendicular to the longitudinal axis L of the link plate. The center of the bore 5 and 5a, respectively, is marked with the reference symbol $B_1$ and $B_2$, respectively.

Along the axes defined in this way, there are some cross sections or, more specifically, regions that shall be described in more detail below.

The center axis LM of the link plate defines a link plate center axis cross section LMQ. Depending on whether the link plate is provided with an opening in the center, there may be a first link plate center axis cross section $LMQ_1$ and a second link plate center axis cross section $LMQ_2$. LMQ is the sum of $LMQ_1$ and $LMQ_2$ or alternatively other partial cross sections.

The bore center axes $BM_1$ and $BMQ_2$ delimit the central region IL of the link plate from the link plate heads $LK_1$ and $LK_2$, respectively.

The longitudinal axis L of the link plate divides the link plate heads $LK_1$ and $LK_2$, respectively, into two link plate head segments each, in particular, therefore, divides the first link plate head $LK_1$ into the segments S1 and S2 and divides the second link plate head $LK_2$ into the segments S3 and S4.

The respective link plate head segments are connected to the central and inner region IL, respectively, of the link plate by the bore wall cross sections, corresponding to S1 with $BMQ_1$, S2 with $BMQ_2$, S3 with $BMQ_3$ and S4 with $BMQ_4$. The respective bore center axis $BM_1$ and $BMQ_2$, respectively, passes through the respective cross sections, that is to say: $BM_1$ through $BMQ_1$ and $BMQ_2$ or $BMQ_2$ through $BMQ_3$ and $BMQ_4$, respectively.

Measures for increasing the chain tension or at least the identical chain tension at reduced weight are proposed for a link chain, in particular, while at the same time maintaining or largely maintaining the other dimensioning parameters of the link chain. This measure increases the cost effectiveness of the chain and conserves resources.

A first measure is the offset of a section 12 of the link plate(s), preferably the central section, in particular, of the outer link plate, in the direction of the chain center KM.

The starting situation is as follows. A conventional link chain is shown in FIG. 1.

In theory and without taking into account an elastic deformation, the transmission of a tension force between the pin and the bushing takes place as a pure line load. This situation shall be represented by the arrows S in FIG. 1. In addition, the direction of tension is indicated by the arrow Z.

Figure 1A:
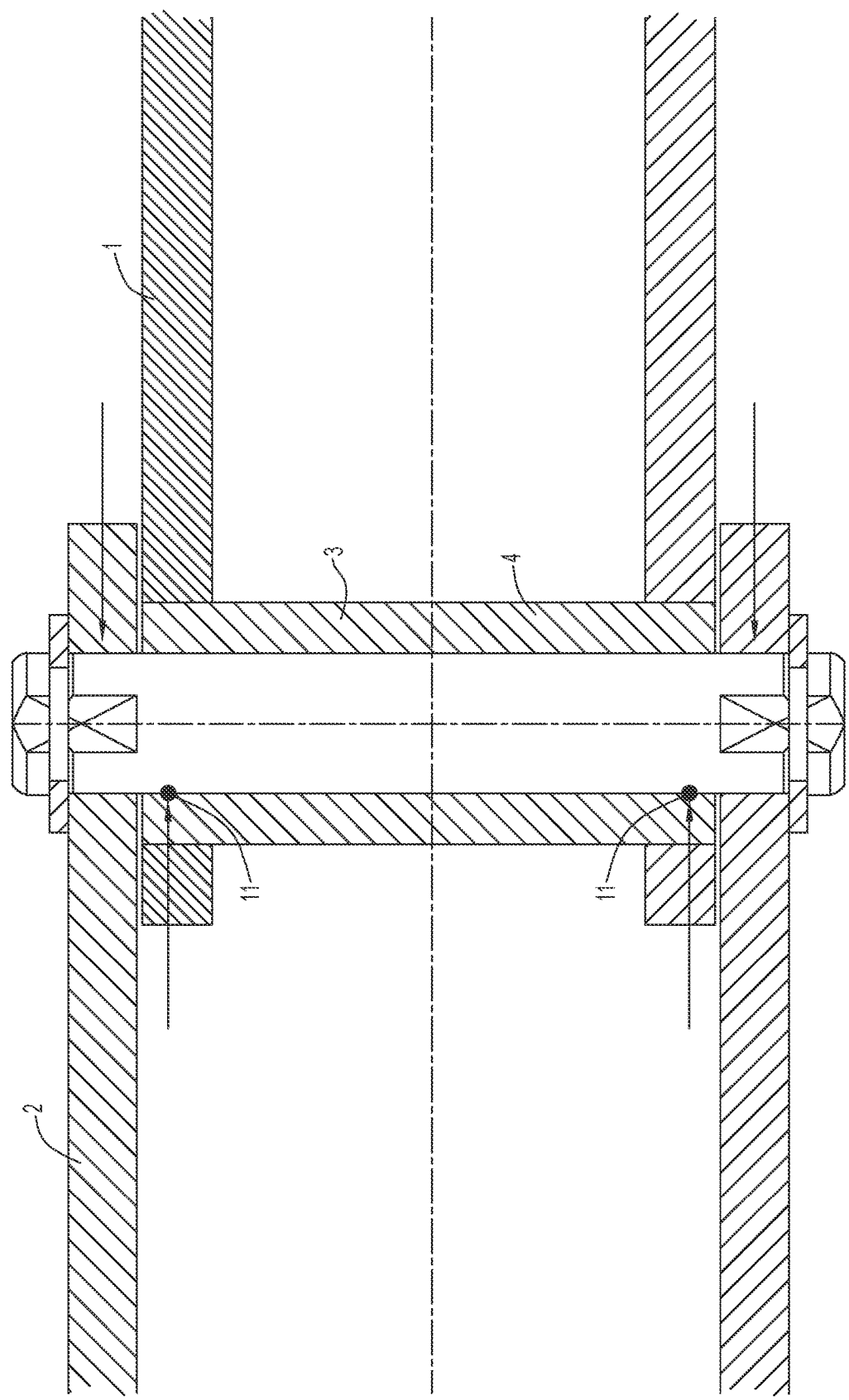
FIG. 1a is a conventional link chain with high tensile load and punctiform transmission of force between pin and bushing.

Due to the chain tension those components of the link chain that are involved in the flow of force are deformed in a strictly elastic manner, but up to a certain force. This deformation has an impact on the contact between link bushing and chain pin. Due to the deflection of the pin, the contact shifts into the outer region of the bushing bore. This effect is intensified as the tension of the chain increases. In mathematical terms a point-shaped contact between the bushing and the pin can be assumed. The resulting position or, more specifically, point of force transmission is shown by the point with the reference numeral 11 in FIG. 1a.

Owing to the press fit between the pin and the outer link plate the outer link plate can also be deformed by the bending of the pin. The result is a deflection of the outer link plate towards the chain center KM. This results in tensile stresses on the side, facing the chain center KM, and compressive stresses on the outwards facing side in the outer link plate. These stresses are superimposed with those tensile stresses within the link plate that result from the chain tension forces.

Figure 1B:
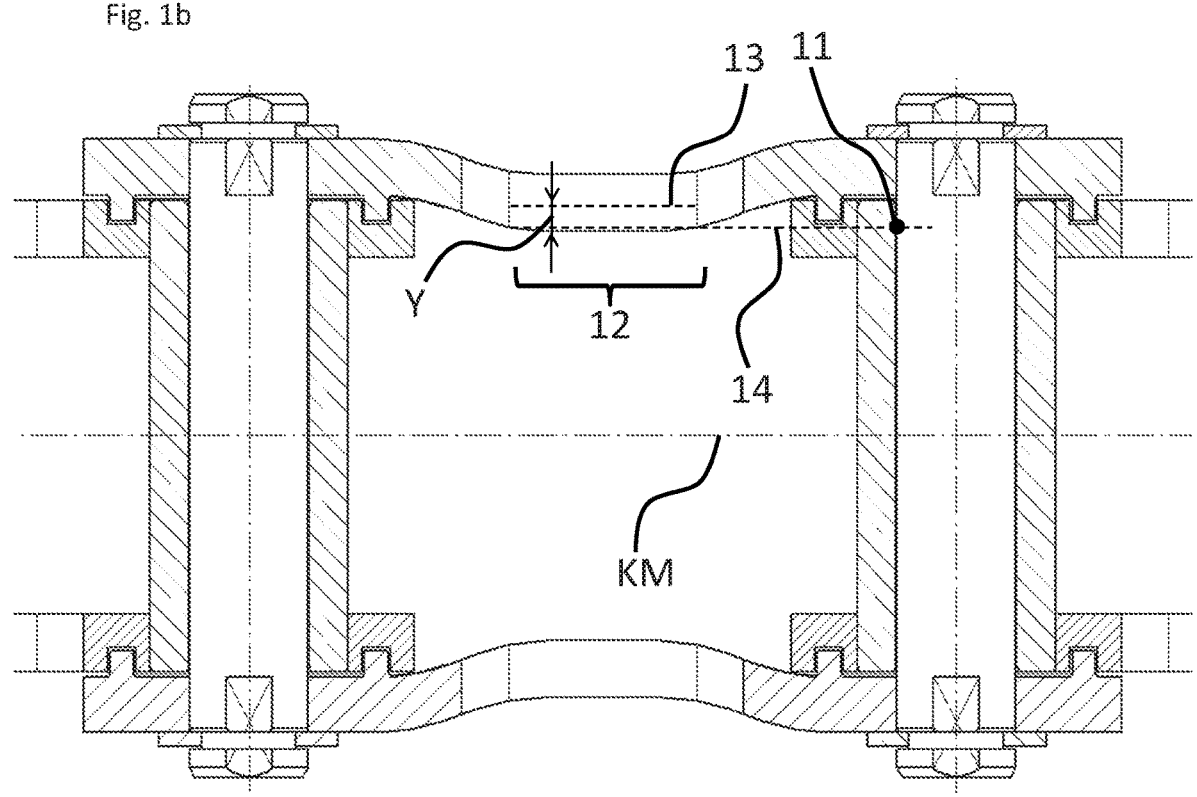
FIG. 1b is an inventive link chain with a section that is offset from the center of the chain.

In accordance with the described link chain, it is provided that a section 12 of the outer link plate is offset in the direction of the chain center axis KM. Such a link chain is shown in FIG. 1b.

In this way, in particular, the bending stresses in the outer link plate 2 can be reduced. This aspect increases the chain tension or alternatively the cost effectiveness and conserves resources. The offset section 12 has a section center line 13 that runs parallel to the chain center axis KM. Furthermore, a line 14 is drawn through the point 11, which should also run parallel to the section center line 13 or, more specifically, the chain center line KM. The vertical distance between the line 14 and the section center line 13 is marked with the reference symbol Y.

The amount, by which the aforementioned offset should occur, may be defined by the section center line 13 of the offset section 12 with respect to the aforementioned point 11 of the transmission of force in the case of an elastic deformation. The more exactly the section center line 13 of the offset section 12 passes through the force transmission point 11, the greater the effect of the reduction in the bending stresses in the outer link plate is. Or, in other words, the shorter the distance Y, the greater the effect of the reduction in the bending stresses in the outer link plate is.

In other words, the section center line 13 passes preferably through the force transmission point 11 or at least approximately.

Furthermore, the closer the offset section can be brought to the chain link, the greater the effect of the reduction is, wherein, of course, the offset cannot be carried out in the region of the link plate heads for geometric reasons.

The chain tension of a link chain can also be increased or alternatively at least the same chain tension at reduced weight can be achieved by the following measure, in particular, while maintaining or largely maintaining the other dimensioning parameters of the link chain.

Figure 2:
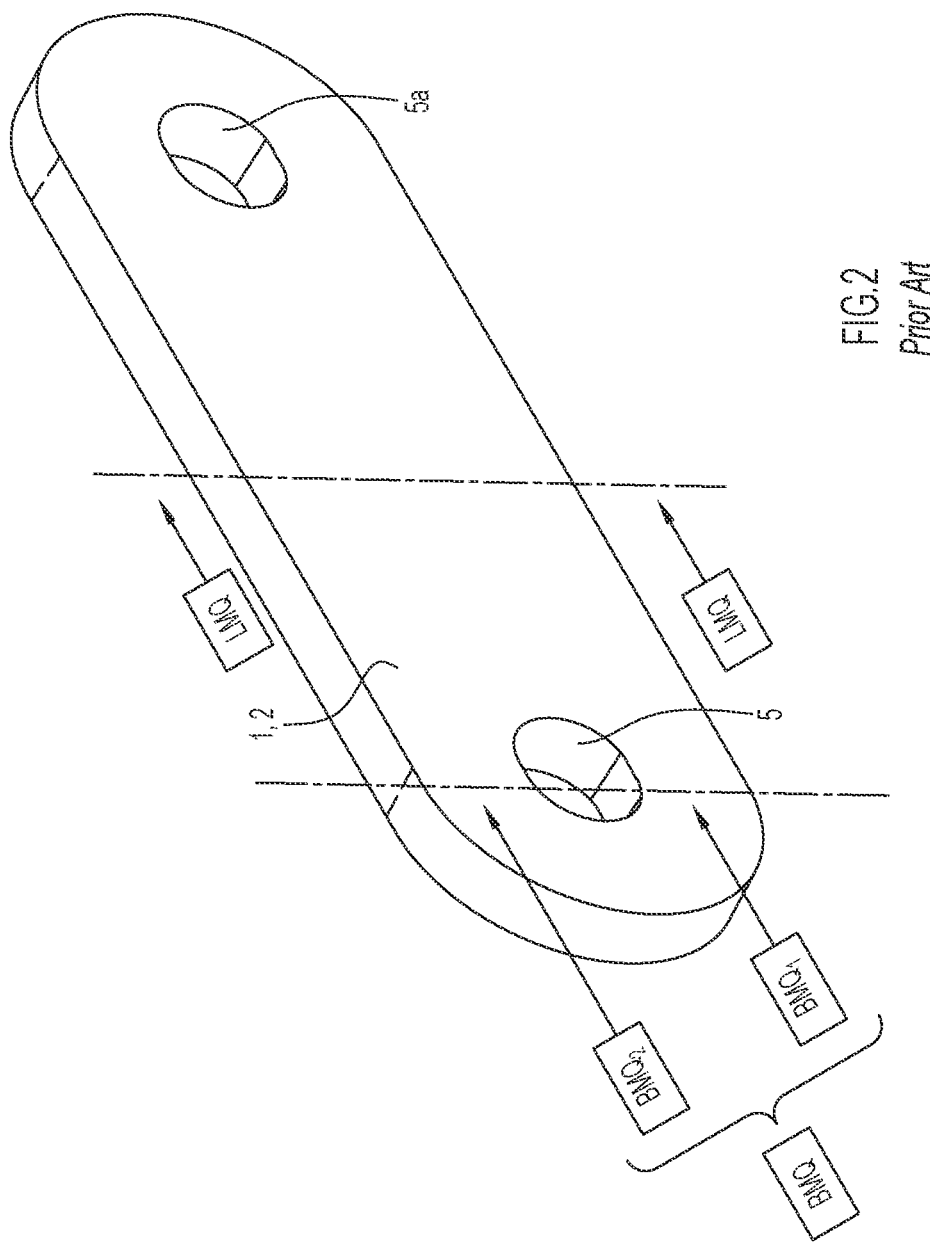
FIG. 2 is a conventional outer link plate of a link chain.

The shape of a conventional link plate is shown in FIG. 2. The different cross sections perpendicular to the direction of the chain tension are also shown. As a result, there are significantly reduced cross-sectional areas BMQ in the region of the bores 5. In contrast, the central region of the link plate has a much larger cross-sectional area LMQ. The goal is to adapt the cross-sectional areas BMQ and LMQ such that the results are approximately the same distributions of stress.

For this purpose the following measure is proposed. The contour of the link plate can be designed, as desired, by choosing suitable manufacturing processes (forging, laser machining, water jet cutting, etc.). The removal of the regions with minimal stresses results in a waisted shape of the link plate. In the figures the contour of the waisting is marked with the reference numeral 21; and the removed regions are marked with the dashed-dotted line 22. The waisting is carried out such that the cross-sectional areas perpendicular to the direction of the chain tension converge in large regions of the link plate. In FIG. 2a, a waisted outer link plate is shown in schematic form in a plan view. FIG. 2b shows a cross section $BMQ_1$ and $BMQ_2$ according to section X-X; and correspondingly FIG. 2c shows a cross section LMQ according to section Y-Y. Preferably it shall hold that $BMQ_1+BMQ_2$ should be equal or approximately equal to LMQ. Or, also expressed differently, Q (L), where L in the longitudinal direction of the link plate shall be constant or approximately constant.

The stress flow within a link plate wraps around the bores in the link plate eyes. In the central region of the link plate the stresses are distributed more uniformly over the entire cross section.

The chain tension of a link chain can also be increased or alternatively at least the same chain tension at reduced weight can be achieved by the following measure, in particular, while maintaining or largely maintaining the other dimensioning parameters of the link chain. The background is that the cross-sectional areas of the link plates are inevitably weakened by the necessary bores for inserting the bushings and pins in the region of the link plate heads. The transmission of the chain tension forces gives rise to elevated concentrations of stress in these cross sections, referred to as the critical cross sections, in the head region of the link plates.

Figure 3:
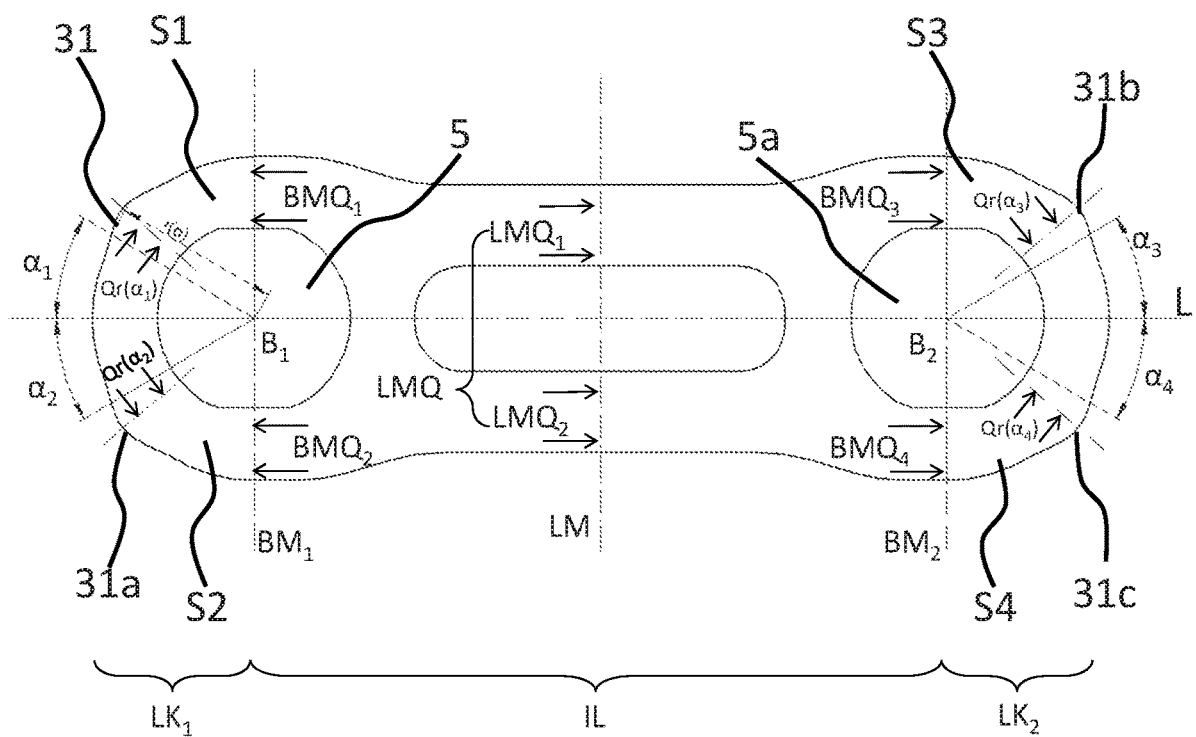
FIG. 3 is an inventive link plate with a reinforced contour in the region of the link plate heads.

The local reinforcement of the link plate heads $LK_1$ and $LK_2$, respectively, of the inner and/or outer link plates can be used to increase the breaking force when the chain dimensions (bushing diameter, pin diameter, link plate height, link plate thickness, link plate length, pitch . . . ) are fixed. Such an optimized inner link plate can have, for example, the contour shown in FIG. 3. The region of the reinforcement is marked with the reference numeral 31. The radius of the head region of such a link plate can be defined, as a function about the center of the bore, by the angle $\alpha$ as a running coordinate.

It can be seen that the outer link plate and/or the inner link plate is/are provided with at least one reinforcement 31, in particular, that each link plate head segment S1 to S4 is provided with one reinforcement 31 to 31c each.

The location and extent of the reinforcement can be described in more detail by the first reinforcement 31 at the first link plate head segment S1.

The reinforcement 31 is arranged preferably in the range of an angle $\alpha 1$ of 20° to 50°, more preferably in the range between 25° and 40°, relative to the longitudinal axis L of the link plate and the center B of the bore 5 in or on the link plate, in particular, on the outside of the link plate head segment S1. Correspondingly the link plate longitudinal axis L defines the angle 0°.

With respect to the extent of the reinforcement 31 as a thickening of the link plate head segment S1, the bore wall cross section $BMQ_1$ between the inner link plate IL and the first link plate head segment S1 may be used. As already shown above, the bore wall cross section $BMQ_1$ should be arranged centrally and vertically above the bore. Starting from this cross section, it is preferably provided that the cross section of the reinforced region, each starting radially from the respective bore center B, should be 5% to 25%, preferably 10% to 18%, larger than the bore wall cross section $BMQ_1$ of the respective reinforced link plate head segment. In other words, the cross section $Q_{r(\alpha 1)}$ of the reinforced wall should be 5% to 25%, preferably 10% to 18%, larger than the bore wall cross section $BMQ_1$.

Of course, these explanations can be applied to the other reinforcements 31a to 31c. However, the cross sections are always associated with the respective bores and positions relative to the link plate longitudinal axis and the link plate center axis, thus, $BMQ_2$ and $Q_{r(\alpha 2)}$, $BMQ_3$ and $Q_{r(\alpha 3)}$ and $BMQ_4$ and $Q_{r(\alpha 4)}$.

The chain tension of a link chain with at least one labyrinth seal in the region of the chain link can also be increased or alternatively at least the same chain tension at reduced weight can be achieved by the following measure, in particular, while maintaining or largely maintaining the other dimensioning parameters of the link chain.

The ingress of dirt into the link region of a chain can be delayed by labyrinths. These labyrinths can be implemented in the form of additional components (for example, lamellar sealing ring) or specially designed link plates (grooves and lugs in the region of the pitch holes) in combination with protruding bushings. The air gap within these labyrinths should be adjusted, taking into account the link play as well as the normal wear of the chain components.

In order to increase the chain tension it is proposed to design the lug 41 and the groove 42 of the labyrinth seal on the link plates such that the results are appropriate overlappings in the direction of the chain tension. For this purpose it is proposed that the at least one lug and groove are designed with a length or depth between 10% to 50% of the link plate thickness, preferably in a range of 20% to 40% of the average link plate thickness D of the respective link plate. By the respective link plate is meant the link plate, in which the respective groove and lug, respectively, are located.

These overlappings can also be generated by additional elements. In this case, for example, a ring, which is inserted into two grooves of the inner link plate and the outer link plate during assembly of the chain, is conceivable. Such an alternative is shown in FIG. 4*b*.

Figure 4:
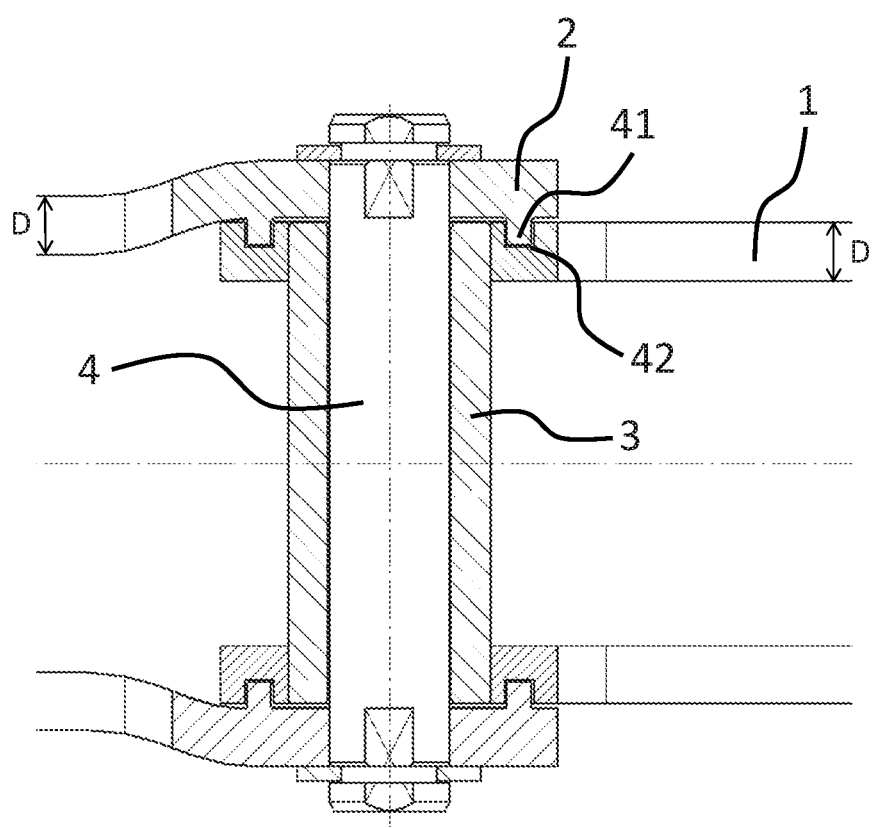
FIG. 4 is a cross-sectional view of a link chain with a labyrinth seal between the outer link plate and the inner link plate.
Figure 4B:
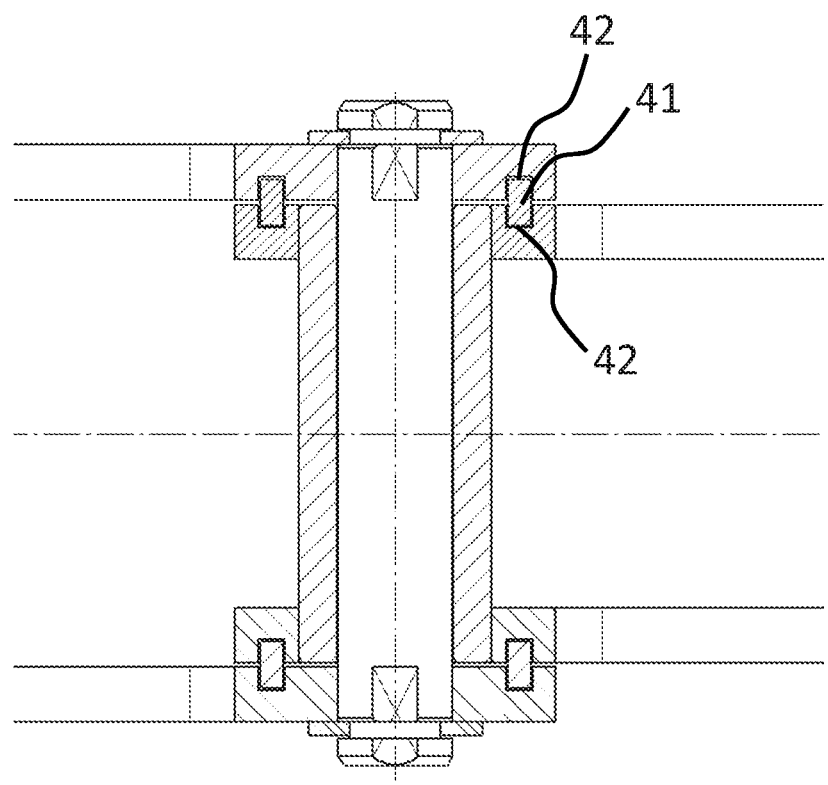
FIG. 4b is a cross-sectional view of a link chain with a labyrinth seal between the outer link plate and the inner link plate with a ring inserted as lugs.

A labyrinth seal of a link chain between the inner link plate and the outer link plate in an unloaded initial state is shown in FIG. 4.

Correspondingly an enlarged view is shown in FIG. 4*a*. In this case, too, the corresponding gap dimensions and width of the lug BN and width of the groove BU, respectively, are shown. In this implementation, too, the respective lug length LN and groove depth TN are shown.

It can be provided that the width of the at least one lug and/or groove is designed with a thickness that is in the range of 80% to 120% of the lug length LN or groove depth TN, respectively.

It can be provided that the corners and edges of the at least one lug and/or groove are each designed with identical radii or chamfers, at a minimum, however, with approximately identical radii or chamfers. As a result, the load-bearing region can be increased in size.

It can be provided that the radial clearance between the at least one groove and lug in the labyrinth is between 0.6 and 2.25 mm. Based on a typical link play between 0.4 and 1.5 mm, the clearance between groove and lug in the labyrinth should be designed approximately 50% larger, depending on the ambient conditions. In this way it is ensured that there is no contact with the labyrinths under normal operating force. The axial clearance can be adjusted in the same way.

If now an overload of the chain (chain tension>>operating force) is generated, then the link plates will lengthen in the cross-sectional area of the bores. As soon as this elongation exceeds the air gap between the labyrinth surfaces, the flow of force within the chain is partially diverted across the labyrinth surfaces.

This leads to a lower load on the already deformed regions of the components (pin, bushing, head regions of the inner and outer link plates). In this case it is clear that not all parts can be relieved at the same time. However, it is possible to subject the more strongly dimensioned components to a larger load in certain regions and to reduce the load on the weaker components. In this way the breaking force of a chain can be optimized in total. At the same time the adjustment of the air gaps within the labyrinths should be adapted, preferably taking into account the ductility of the materials that are used. Owing to the use of high strength and simultaneously ductile materials (for example, 42CrMo4) it is possible to use the labyrinths to maximize the transmission of force.

It is possible to reduce, as a function of how the labyrinth is designed, the load on different components (or component regions) in the chain strand, for example, the head section of the inner link plate, the head region of the outer link plate, the pin in the shear region.

The following preferred constellations have emerged in practice for reducing the load on certain regions.

Figure 4C:
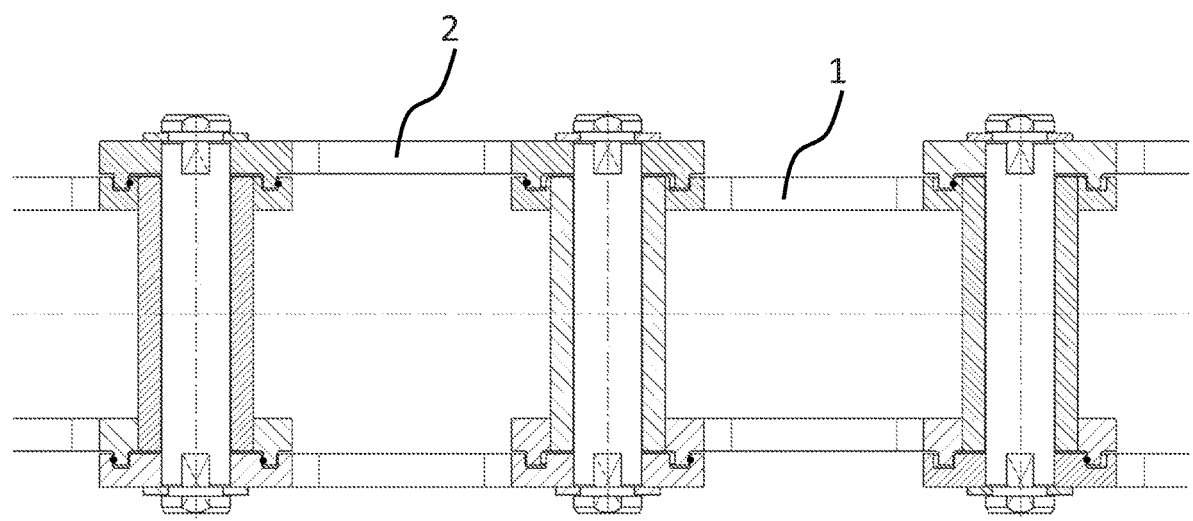
FIG. 4c is variants of groove and lug in the labyrinth seal.

1. groove in the inner link plate/lug on the outer link plate
   1.1 identical play on both sides reduces the load on the pin
   1.2 increased play inwards reduces the load on the pin and the head region of the outer link plate
   1.3 increased play outwards reduces the load on the pin and the head region of the inner link plate Such constellations are shown from left to right in the upper row in the drawing FIG. 4*c*.

2. lug on the inner link plate/groove in the outer link plate
   2.1 identical play on both sides reduces the load on the pin
   2.2 increased play inwards reduces the load on the pin and the inner link plate
   2.3 increased play outwards reduces the load on the pin and the outer link plate Such constellations are shown from left to right in the bottom row in the drawing FIG. 4*c*.

An additional measure for improving a link chain, in particular, for reducing material fatigue, is proposed below.

In operation, lengthening of the chain may become necessary due to the occurring malfunctions, overload situations or other influences. These changes in length are distributed within the chain on those regions that exhibit the least stiffness. Should this load occur repeatedly, then there is a risk of material fatigue at these positions.

A material fatigue can be counteracted by the following measures.

The link chain, in particular, the inner link plates and/or the outer link plates, are constructed as homogeneously as possible with respect to their stiffness by the feature that the cross section perpendicular to the longitudinal axis L of the at least one inner link plate 1 and/or the outer link plate 2 along the longitudinal axis of the L of the link plate deviates less than 20%, preferably less than 10% from one another, more preferably is identical. In other words, the link plate center axis cross section LMQ should be just as large, or alternatively with a deviation of 20% or rather 10% as large, as the entire bore wall cross section $BMQ_1+BMQ_2$ of a bore 5 or the entire bore wall cross section $BMQ_3+BMQ_4$ of the other bore 5*a*, respectively, expressed mathematically $LMQ=BMQ_1+BMQ_2\pm 20\%$ or rather $\pm 10\%$, and/or $LMQ=BMQ_3+BMQ_4\pm 20\%$ or rather $\pm 10\%$.

In operation this distributes necessary changes in length to larger regions of the chain and, in so doing, reduces the risk of material fatigue.

Correspondingly the cross section LMQ can be adjusted by the material recesses, which, for example, results in a link plate that is waisted or is provided with recesses. In particular, if a recess in the form of a link plate break-through is used to adjust the cross section LMQ, then, for example, in the case of a central opening the cross section is composed of the cross sections $LMQ_1$ and $LMQ_2$. In this way the stiffnesses can be adjusted by opening(s) in the central link plate regions. This design should be used, especially if the outer contour of the link plates is fixed due to certain conditions. This may result, for example, from a sliding removal of forces across the link plates.

Figure 5:
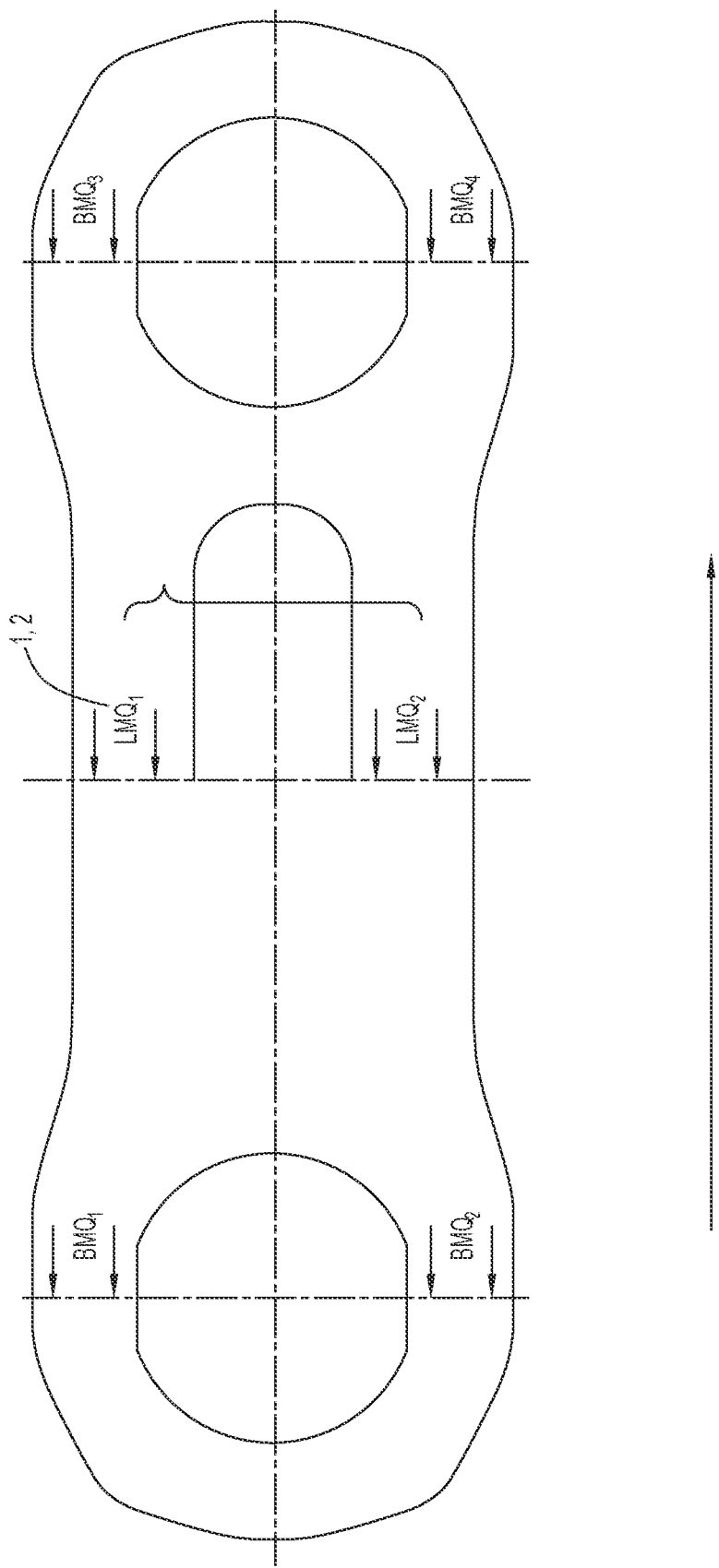
FIG. 5 is a link chain that is designed as homogeneously as possible with respect to its stiffness.
Figure 5A:
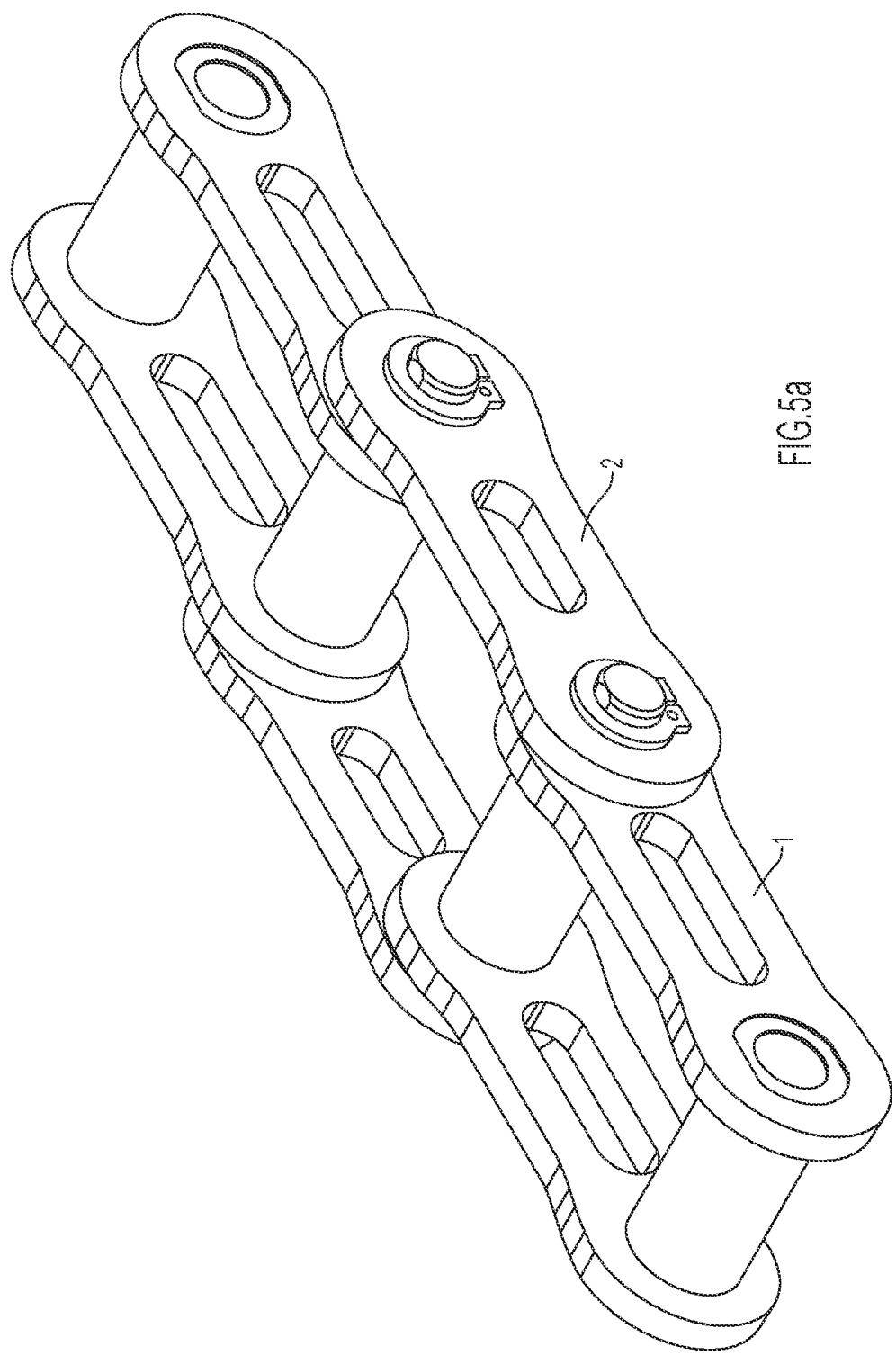
FIG. 5a is a view of cross sections of a chain according to FIG. 5.
Figure 6:
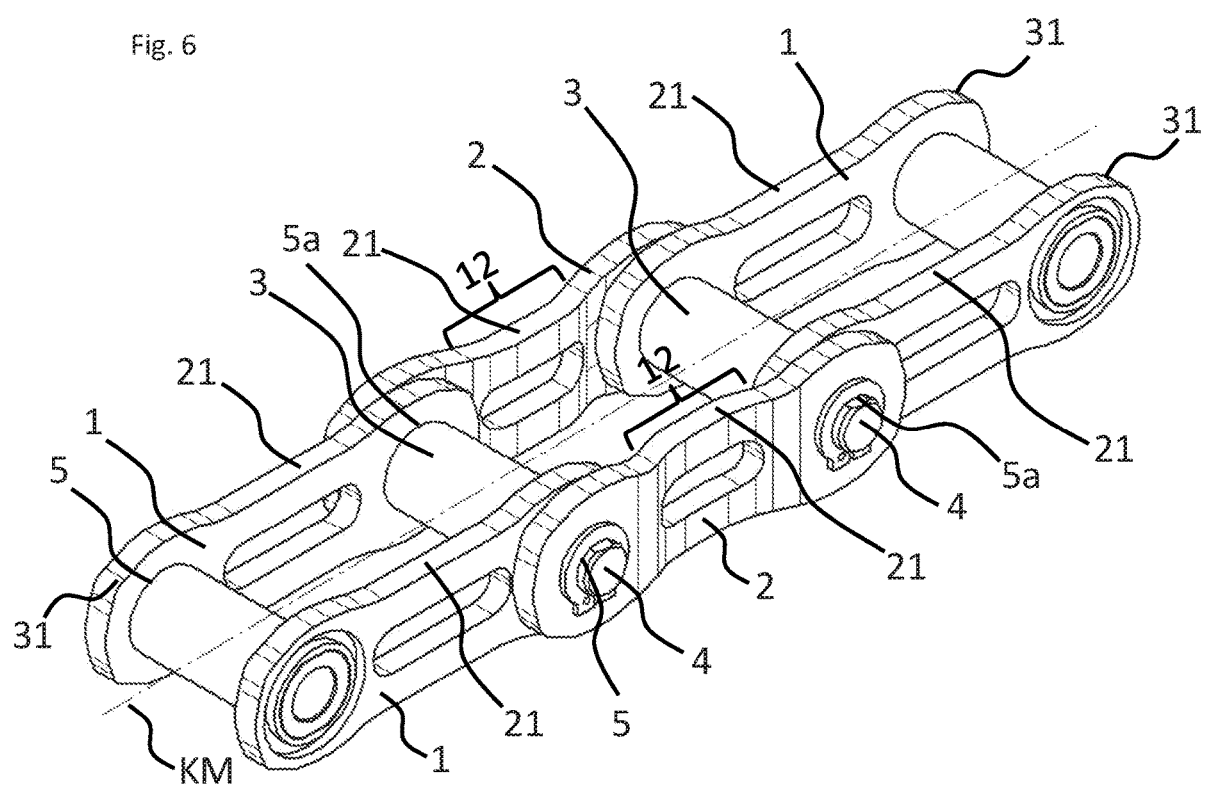
FIG. 6 is an inventive link chain in a perspective view.

A link chain that is designed as homogeneously as possible with respect to its stiffness is shown in FIG. 5a. In FIG. 5 corresponding cross sections are indicated. An inventive link chain, in which all of the measures described above have been implemented, is shown in FIG. 6. All of the measures proposed above may be carried out individually or in any combination at a link chain. Furthermore, they are also suitable for the inner link plate and/or the outer link plate of a link chain.

What is claimed is:

1. A link chain, comprising:
an inner link plate;
an outer link plate;
a bushing and a pin that form a chain link; and
a labyrinth seal between the outer link plate and the inner link plate, the labyrinth seal comprising at least one lug having a lug length and at least one groove having a groove depth, the lug length and the groove depth being between 10% to 50% of an average respective link plate thickness, wherein in response to an overload of the link chain, a flow of force within the link chain is partially diverted across surfaces of the labyrinth seal formed by the at least one lug and the at least one groove, wherein
the at least one groove is formed in the inner link plate and the at least one lug is formed on the outer link plate or
the at least one groove is formed in the outer link plate and the at least one lug is formed on the inner link plate.

2. The link chain of claim 1, wherein each lug length and groove depth is between 20% to 40% of the average respective link plate thickness.

3. The link chain of claim 1, wherein
a width of the at least one lug is between 80% and 120% of the lug length, or
a width of the at least one groove is between 80% and 120% of the groove depth, or
the width of the at least one lug is between 80% and 120% of the lug length and the width of the at least one groove is between 80% and 120% of the groove depth.

4. The link chain of the claim 1, wherein the radial clearance between the at least one groove and lug in the labyrinth is between 0.6 and 2.25 mm.

5. The link chain of claim 1, wherein corners and edges of the at least one lug and/or groove have approximately identical radii or chamfers.

6. The link chain of claim 1, wherein the labyrinth seal is undercut, such that the at least one groove and lug are dovetailed.

7. The link chain of claim 1, wherein the link chain has a chain center extending in a longitudinal direction, wherein the outer link plate has an offset section that is offset in the direction of the chain center, and wherein the offset section is arranged between the chain links in a central region of the outer link plate.

8. The link chain of claim 7, wherein the offset section has a section center line that runs parallel to the chain center, wherein a transmission of force between the bushing and pin in a tension-loaded chain concentrates at a force transmission point, wherein the section center line passes approximately through the force transmission point.

9. The link chain of claim 1, wherein the outer link plate and/or the inner link plate is waisted.

10. The link chain of claim 1, wherein the inner link plate and/or the outer link plate comprises at least two reinforcements spaced apart from one another and from a longitudinal axis of the inner link plate or of the outer link plate, the at least two reinforcements being arranged on link plate heads of the inner link plate and/or the outer link plate.

11. The link chain of claim 10 wherein:
the inner link plate and/or the outer link plate has link plate heads and at least two bores in a region of the link plate heads for receiving the bushing and the pin, respectively;
the inner link plate and/or the outer link plate has a link plate longitudinal axis;
the inner link plate and/or the outer link plate has a link plate center axis arranged centrally between the bores and is aligned perpendicular to the link plate longitudinal axis;
the inner link plate and/or the outer link plate has bore center axes that pass through the center of the bores and are aligned perpendicular to the link plate longitudinal axis;
the bore center axes delimit a first link plate head and a second link plate head from an inner region of the inner link plate and/or the outer link plate;
the link plate longitudinal axis divides the first link plate head into a first link plate head segment and a second link plate head segment; and the link plate longitudinal axis divides the second link plate head into a third link plate head segment and a fourth link plate head segment (S4); and
the first, second, third, and fourth link plate head segments have a bore wall cross section by which they are connected to the inner region of the link plate, through which the respective bore center axis passes.

12. The link chain of claim 11, wherein the at least two reinforcements are arranged on the inner and/or outer link plate or the link plate heads of the inner and/or outer link plate in the range of an angle α of 20° to 50° relative to the longitudinal axis and the center of the bore.

13. The link chain of claim 11, wherein the at least two reinforcements comprise a thickening of the inner and/or outer link plate or the link plate heads of the inner and/or outer link plate.

14. The link chain of claim 11, wherein each of the two reinforcements has a cross section, which starts radially from the bore center B and is 5% to 25% larger than the bore wall cross section of the respective reinforced link plate head segment.

15. The link chain of claim 1, wherein
a cross section perpendicular to a longitudinal axis of the at least one inner link plate deviates less than 20% from a cross section along the longitudinal axis of the at least one inner link plate; or
a cross section perpendicular to a longitudinal axis of the at least one outer link plate deviates less than 20% from a cross section along the longitudinal axis of the at least one outer link plate; or
the cross sections perpendicular to the longitudinal axes of the at least one inner link plate and the at least one outer link plate respectively deviate less than 20% from the cross sections along the longitudinal axes of the at least one inner link plate and the at least one outer link plate.

16. The link chain of claim 15, wherein the cross section is adjusted by waistings and/or recesses of the at least one inner link plate and/or the at least one outer link plate.

* * * * *